United States Patent
Kurihara et al.

(10) Patent No.: US 10,098,071 B2
(45) Date of Patent: Oct. 9, 2018

(54) COLLECTING SYSTEM, COLLECTING APPARATUS, AND POWER CONTROL METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/624,085

(22) Filed: Jun. 15, 2017

(65) Prior Publication Data
US 2017/0289919 A1    Oct. 5, 2017

Related U.S. Application Data

(63) Continuation of application No. PCT/JP2014/083466, filed on Dec. 17, 2014.

(51) Int. Cl.
*H04B 7/00* (2006.01)
*H04W 52/24* (2009.01)
(Continued)

(52) U.S. Cl.
CPC ......... *H04W 52/241* (2013.01); *H04W 52/46* (2013.01); *H04W 84/18* (2013.01)

(58) Field of Classification Search
CPC ..... H04W 52/46; H04W 84/18; H04W 52/00; H04W 52/04; H04W 52/243; H04W 36/20
(Continued)

(56) References Cited

U.S. PATENT DOCUMENTS 8,036,186 B2 * 10/2011 Gupta ................... H04W 52/10
370/252
9,287,911 B1 * 3/2016 Chindapol ............... H04B 1/10
(Continued)

FOREIGN PATENT DOCUMENTS

JP    2007-60342    3/2007
JP    2007-142520    6/2007
(Continued)

OTHER PUBLICATIONS

International Search Report dated Mar. 31, 2015 in corresponding International Application No. PCT/JP2014/083466.
(Continued)

*Primary Examiner* — Sonny Trinh
(74) *Attorney, Agent, or Firm* — Staas & Halsey LLP

(57) ABSTRACT

An observation system includes a plurality of nodes and an observation apparatus that collects information from the nodes using multi-hop communication for communicating with the nodes. The observation apparatus includes a link quality indicator (LQI) determination section and an output control section. The LQI determination section determines whether an LQI received from a node using the multi-hop communication is larger than a first threshold. When the LQI is larger than the first threshold, the output control section outputs a reduction command to the node associated with the LQI, the reduction command being a command to change the amount of transmission power in the multi-hop communication.

6 Claims, 10 Drawing Sheets

(51) Int. Cl.
*H04W 52/46* (2009.01)
*H04W 84/18* (2009.01)

(58) Field of Classification Search
USPC .......... 455/522, 517, 63.1, 114.2, 278.1, 296
See application file for complete search history.

(56) References Cited

U.S. PATENT DOCUMENTS

2009/0093267 A1* 4/2009 Ariyur .................. H04W 52/12
 455/522
2013/0208583 A1 8/2013 Jianlin et al.
2016/0309345 A1* 10/2016 Tehrani ............. H04W 72/0426

FOREIGN PATENT DOCUMENTS

| | | |
|---|---|---|
| JP | 2010-232890 | 10/2010 |
| JP | 2011-13765 | 1/2011 |
| JP | 2011-146850 | 7/2011 |
| JP | 2012-39521 | 2/2012 |
| JP | 2012-256982 | 12/2012 |
| JP | 2014-22770 | 2/2014 |
| JP | 2014-123791 | 7/2014 |
| WO | WO 2013/118904 A1 | 8/2013 |

OTHER PUBLICATIONS

Written Opinion of the International Searching Authority dated Mar. 31, 2015 in corresponding International Application No. PCT/JP2014/083466.

\* cited by examiner

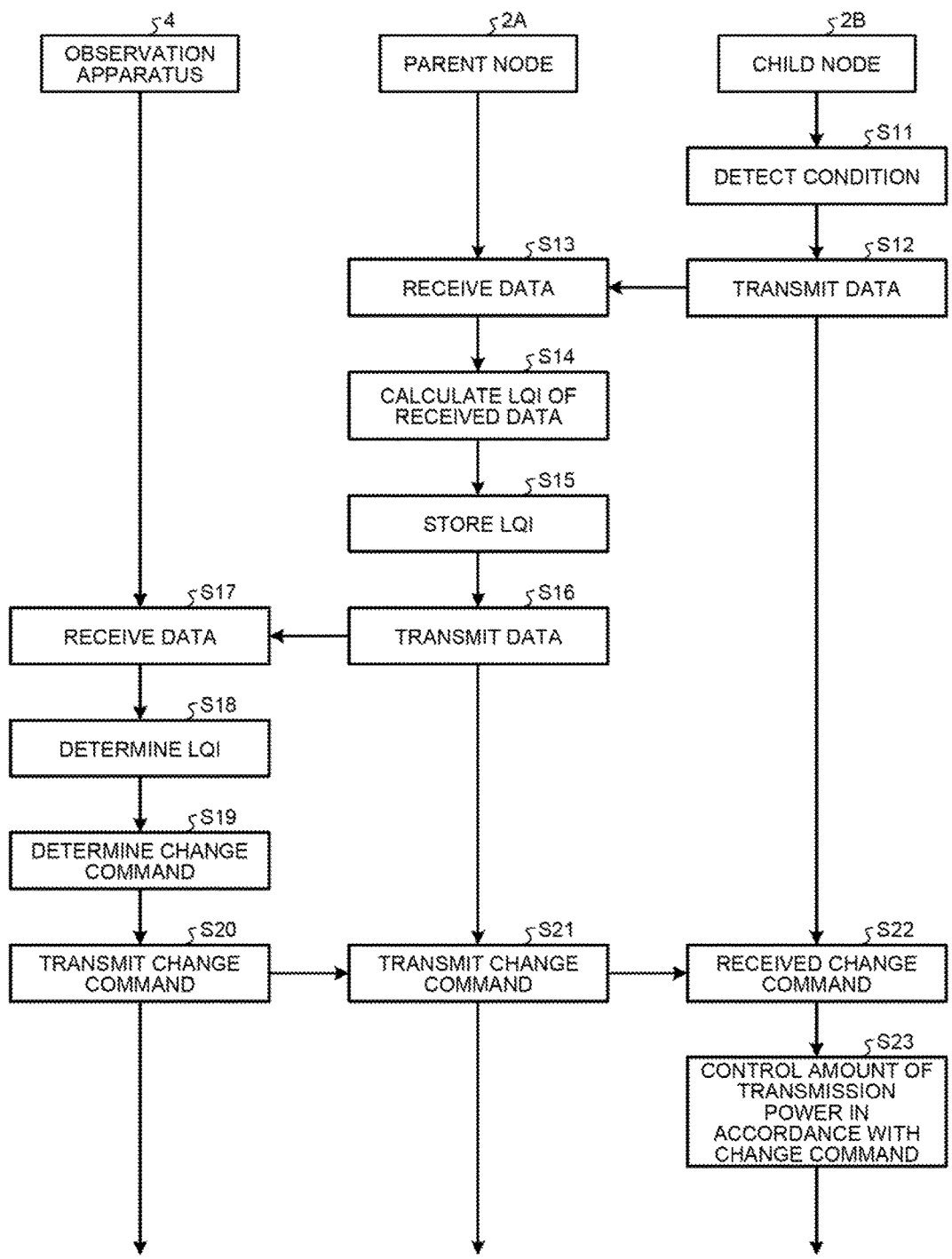

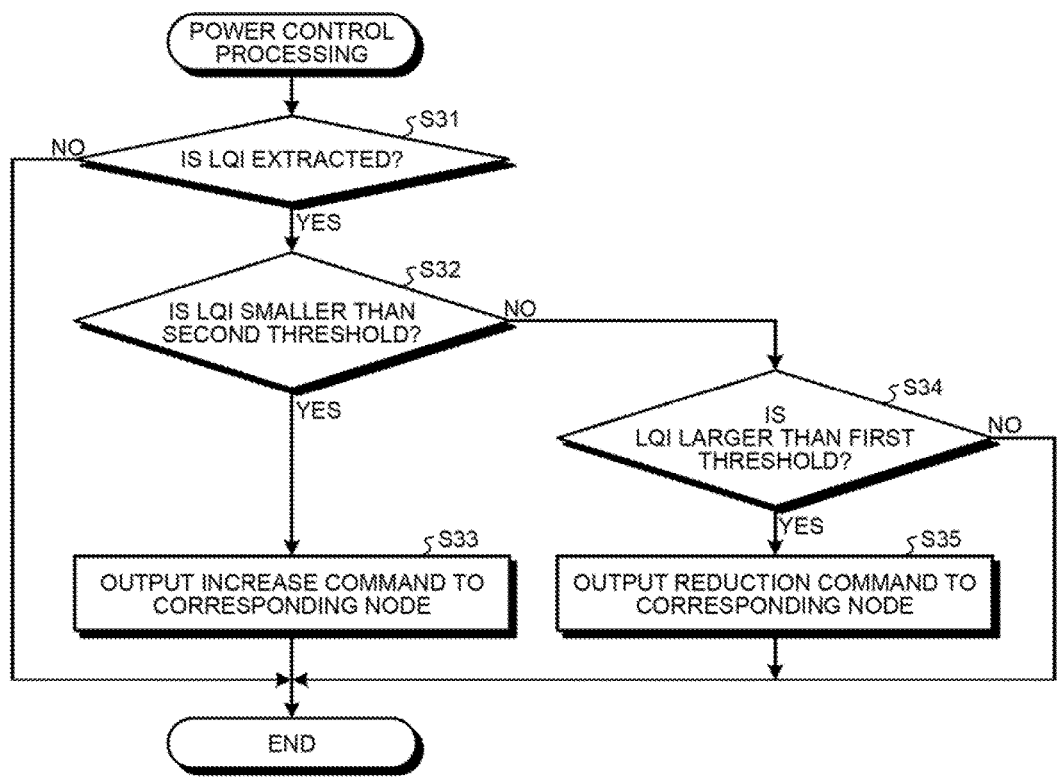

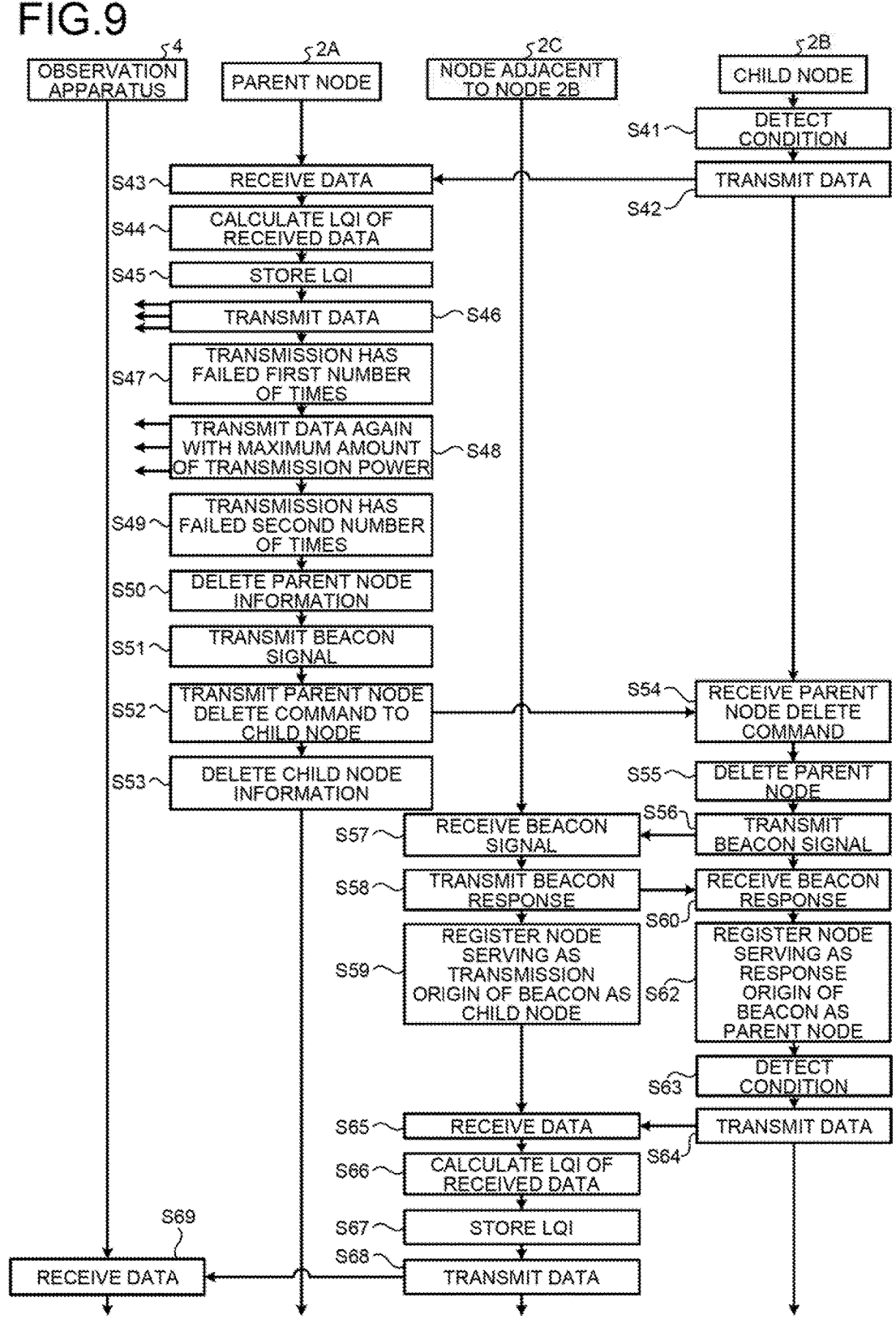

COLLECTING SYSTEM, COLLECTING APPARATUS, AND POWER CONTROL METHOD

CROSS-REFERENCE TO RELATED APPLICATION

This application is a continuation of International Application No. PCT/JP2014/083466, filed on Dec. 17, 2014, the entire contents of which are incorporated herein by reference.

FIELD

The embodiment discussed herein is related to a collecting system, a collecting apparatus, and a power control method.

BACKGROUND

Wireless sensor network systems (WSNSs) have been known that distribute and arrange sensor nodes (hereinafter simply called nodes) to sensing targets such as cliffs, loads, and buildings and collect conditions of the sensing targets using wireless communication. An example of the WSNSs includes an observation apparatus that collects conditions detected by respective nodes and determines the condition of the sensing target on the basis of the collecting result.

Each node, however, does not have an amount of power large enough to enable the node to directly communicate with the observation apparatus, i.e., has a limited amount of power for wireless communication. The WSNS, thus, employs multi-hop communication by which the collected condition is relayed between adjacent nodes. As a result, the observation apparatus can collect the conditions collected by the respective nodes using the multi-hop communication between nodes in the WSNS.

Conventional technologies are described in Japanese Laid-open Patent Publication No. 2007-60342, Japanese Laid-open Patent Publication No. 2014-22770, and Japanese Laid-open Patent Publication No. 2011-13765, for example.

To reliably perform the multi-hop communication with the node serving as a communication partner, the amount of transmission power for multi-hop communication of each node is often set to a maximum amount by default. As a result, the power consumption of each node is large. In this way, the amount of transmission power of each node is statistically or equally set.

SUMMARY

According to an aspect of an embodiment, a collecting system includes a plurality of nodes and a collecting apparatus. Each of the nodes includes a first processor. The collecting apparatus collects information from the nodes using multi-hop communication for communicating with the nodes. The collecting apparatus includes a second processor. The second processor is configured to determine whether communication quality received from the node using the multi-hop communication is higher than a certain threshold. The second processor is configured to output a change command to the node associated with the communication quality when determining that the communication quality is higher than the certain threshold, the change command being a command to change an amount of transmission power in the multi-hop communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a sequence diagram illustrating an example of processing operation of the whole of the observation system in relation to power control processing;

FIG. 8 is a flowchart illustrating an example of processing operation of a controller included in the observation apparatus in relation to the power control processing;

FIG. 9 is a sequence diagram illustrating an example of the processing operation of the whole of the observation system in relation to route change processing;

DESCRIPTION OF EMBODIMENT

The following describes an embodiment of a collecting system, a collecting apparatus, and a power control method according to the present invention in detail with reference to the accompanying drawings. The technique disclosed herein is not limited to the embodiment. The following respective embodiments may be appropriately combined without inconsistency among them.

Figure 1:
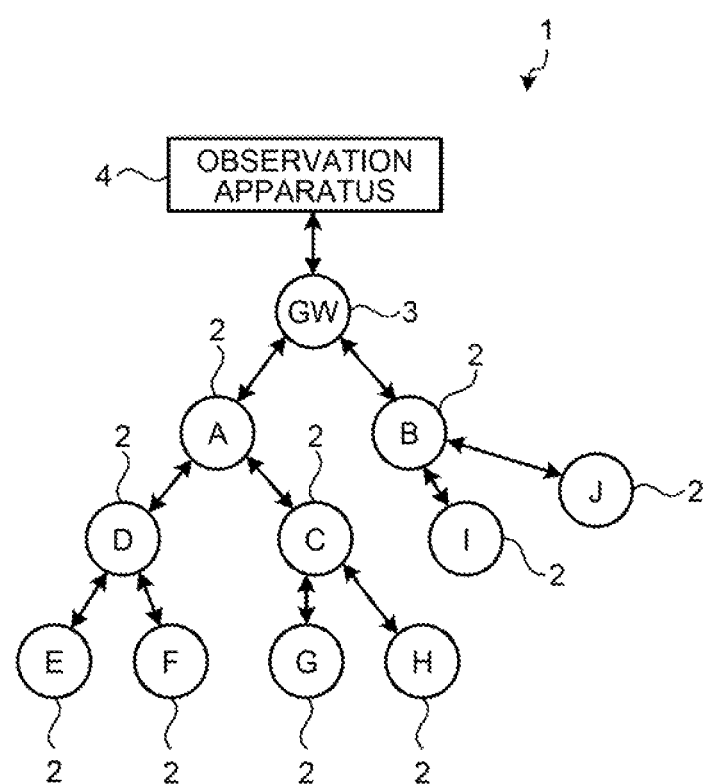
FIG. 1 is a schematic diagram explaining an observation system according to an embodiment.

FIG. 1 is a schematic diagram explaining an observation system 1 according to an embodiment. The observation system 1 illustrated in FIG. 1, which is a wireless sensor network system (WSNS), for example, includes a plurality of nodes 2, a gateway (GW) 3, and an observation apparatus 4. The nodes 2, which are distributed and arranged to sensing targets such as cliffs, loads, and buildings, for example, are sensor nodes that detect conditions of the sensing targets. The nodes 2 in the observation system 1 communicate with each other in a wireless manner using multi-hop communication. The nodes 2, which are in a parent-child relation, for example, communicate with each other in a wireless manner using the multi-hop communication. The GW 3 is a communication apparatus that establishes a communication connection between the observation apparatus 4 and the nodes 2. The observation apparatus 4 is a collecting apparatus that collects data on the conditions detected by the respective nodes 2 from the GW 3. The observation apparatus 4 is an information processing apparatus such as a server, for example. The observation system 1 is a collecting system that collects information from the respective nodes 2 through the observation apparatus 4.

In the observation system 1 illustrated in FIG. 1, when the node 2 denoted "E" and the node 2 denoted "F" are child nodes, the node 2 denoted "D" is the parent node of both of the node 2 denoted "E" and the node 2 denoted "F" while when the node 2 denoted "D" is the child node, the node 2 denoted "A" is the parent node of the node 2 denoted "D". Furthermore, when the node 2 denoted "G" and the node 2 denoted "H" are child nodes, the node denoted "C" is the parent node of both of the node 2 denoted "G" and the node 2 denoted "H" while when the node 2 denoted "C" is the child node, the node 2 denoted "A" is the parent node of the node 2 denoted "C". Furthermore, when the node 2 denoted "I" and the node 2 denoted "J" are child nodes, the node 2 denoted "B" is the parent node of both of the node 2 denoted "I" and the node 2 denoted "J". The GW 3 connects with the node 2 denoted "A" and the node 2 denoted "B" in a wireless manner. Furthermore, the GW 3 establishes communication connection with the observation apparatus 4.

Figure 2:
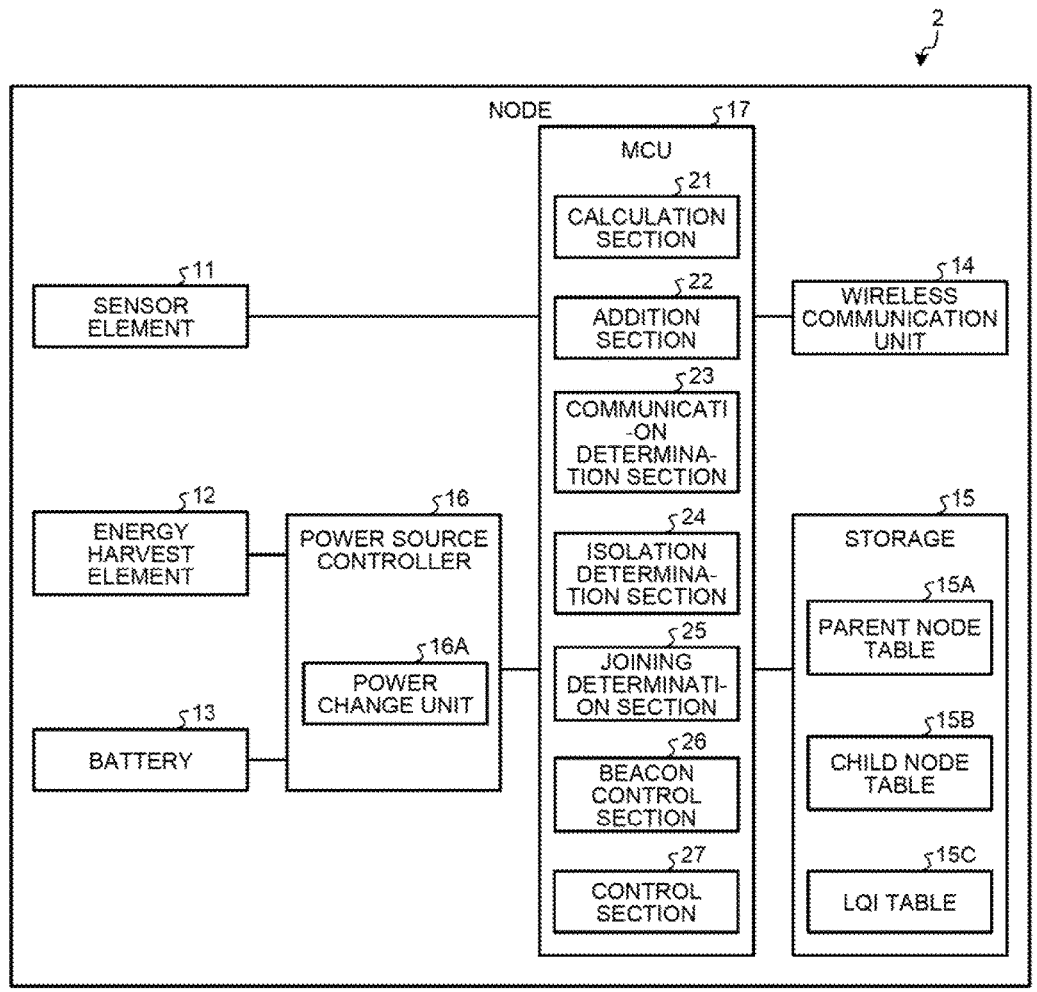
FIG. 2 is a block diagram illustrating an example of a node.

FIG. 2 is a block diagram illustrating an example of the node 2. The node 2 illustrated in FIG. 2 includes a sensor element 11, an energy harvest element 12, a battery 13, a wireless communication unit 14, a storage 15, a power source controller 16, and a micro controller unit (MCU) 17. The sensor element 11 detects a condition of a sensing target. The energy harvest element 12 is a power generation element such as a vibration power generation element, a photovoltaic generation element, a temperature power generation element, or an electric wave power generation element, for example. The battery 13 stores power generated by the energy harvest element 12, for example. The wireless communication unit 14 communicates with the node 2 present in a wireless communication range of approximately several centimeters from this node 2 using the multi-hop communication, for example. The storage 15 is a region in which various types of information are stored. The power source controller 16 controls the energy harvest element 12 and the battery 13. The power source controller 16 includes a power change unit 16A that particularly controls the amount of transmission power of the wireless communication unit 14. The MCU 17 controls the whole of the node 2 with an operation frequency of approximately 1 MHz. The node 2 starts intermittently when detecting a change in the condition of the sensing target through the sensor element 11, for example.

The storage 15 includes a parent node table 15A, a child node table 15B, and a link quality indicator (LQI) table 15C. The parent node table 15A is a region in which an ID identifying the parent node of this node 2 is stored. The ID is a media access control (MAC) address of the parent node, for example. The child node table 15B is a region in which an ID identifying the child node of this node 2 is stored. The ID is the MAC address of the child node, for example. The LQI table 15C is a region in which the LQI of received data is stored for each ID identifying the node 2 serving as the transmission origin of the data.

The MCU 17 reads a power control program stored in the storage 15, and configures various processes as functions on the basis of the read power control program. The MCU 17 includes a calculation section 21, an addition section 22, a communication determination section 23, an isolation determination section 24, a joining determination section 25, a beacon control section 26, and a control section 27. The calculation section 21 calculates an LQI, which indicates the intensity of received electric waves of received data and represents electric wave communication quality, when the node 2 receives the data from the child node 2. The calculation section 21 calculates the LQI as follows, for example: $LQI=(20P+1970)/7$ where P is the electric field intensity with a unit of dBm. The addition section 22 adds the calculated LQI to the received data.

Figure 3:
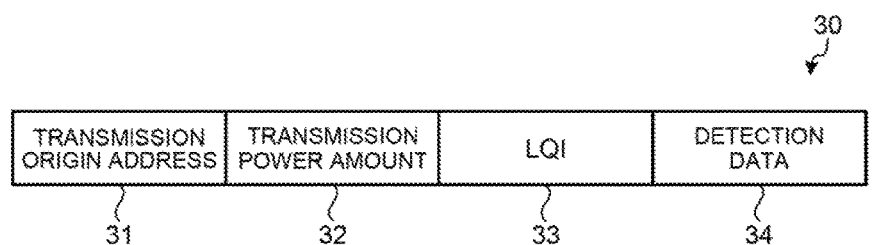
FIG. 3 is schematic diagram explaining an example of a structure of data transmitted by the node.

FIG. 3 is a schematic diagram explaining an example of a data structure. Data 30 illustrated in FIG. 3 includes a transmission origin address 31, a transmission power amount 32, an LQI 33, and detection data 34. The transmission origin address 31 is address information identifying the node serving as the transmission origin of the data. The transmission power amount 32 is the amount of transmission power of the node 2 serving as the transmission origin of data. The LQI 33 is the LQI added to the detection data. The detection data 34 indicates a change in sensing target condition detected by the sensor element 11.

The communication determination section 23 determines whether deterioration is detected in a communication environment with the parent node 2 or the GW 3 (or the observation apparatus 4) in the observation system 1. The communication determination section 23 is an example of the first determination unit. The communication determination section 23 determines that the communication environment has deteriorated when data transmission to the parent node 2 or the GW 3 (or the observation apparatus 4) with an amount of transmission power smaller than a maximum amount of transmission power has failed a first number of times in a certain time period, for example. The communication determination section 23 determines whether it has detected that communication with the parent node 2 or the GW 3 (or the observation apparatus 4) is disabled. The communication determination section 23 is an example of the second determination unit. The communication determination section 23 determines that the communication is disabled when data transmission to the parent node 2 or the GW 3 (or the observation apparatus 4) with the maximum amount of transmission power has failed a second number of times in a certain time period, for example. The beacon control section 26 controls the wireless communication unit 14 such that the wireless communication unit 14 transmits a beacon signal for a certain time period for searching for the node 2 capable of communicating with this node 2 in the observation system 1. The beacon signal includes an ID identifying the node 2 serving as the transmission origin of the beacon signal.

When the joining determination section 25 determines that the joining of the node 2 transmitting the beacon signal is allowed, the beacon control section 26 controls the wireless communication unit 14 such that the wireless communication unit 14 transmits a beacon response to the node 2 serving as the transmission origin of the beacon signal. The beacon response is a response signal with respect to the beacon signal transmitted from the node 2 serving as the transmission origin of the beacon signal, and includes an ID identifying the node 2 serving as the transmission origin of the beacon response. The isolation determination section 24 determines whether the beacon response with respect to the beacon signal is detected in a certain time period from the start of transmitting the beacon signal. When no beacon response is detected, the isolation determination section 24 determines that this node 2 is isolated. The isolation determination section 24 is an example of the third determination unit. When the node 2 serving as the transmission origin of the beacon signal has already registered the parent node, the joining determination section 25 determines that the joining of the node 2 serving as the transmission origin of the beacon signal is permitted.

When the communication determination section 23 determines that the communication with the parent node 2 or the GW 3 (or the observation apparatus 4) is disabled, the control section 27 deletes parent node information indicating that this node 2 is the parent node, and notifies the beacon control section 26 of the start of transmitting the beacon signal. When the isolation determination section 24 determines that this node 2 is isolated, the control section 27 determines whether the child node connecting with this node 2 is present. The control section 27 is an example of the fourth determination unit. When the child node connecting with this node 2 is present, the control section 27 transmits a parent node delete command to the child node.

When receiving the parent node delete command, the control section 27 deletes the parent node of this node 2 already registered in the parent node table 15A. When receiving the beacon response with respect to the beacon signal, the control section 27 registers, in the parent node table 15A as the parent node, the ID of the node 2 serving as the transmission origin of the beacon response. When transmitting the beacon response with respect to the beacon signal, the control section 27 registers, in the child node table 15B as the child node of this node 2, the ID of the node 2 serving as the transmission origin of the beacon signal.

Figure 4:
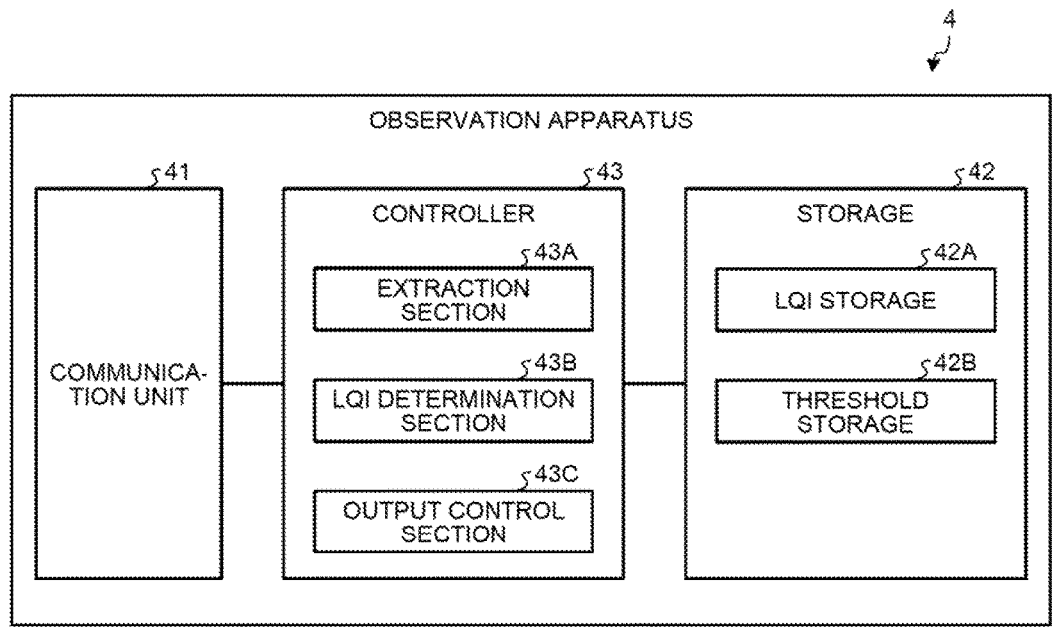
FIG. 4 is a block diagram illustrating an example of an observation apparatus.
Figure 5:
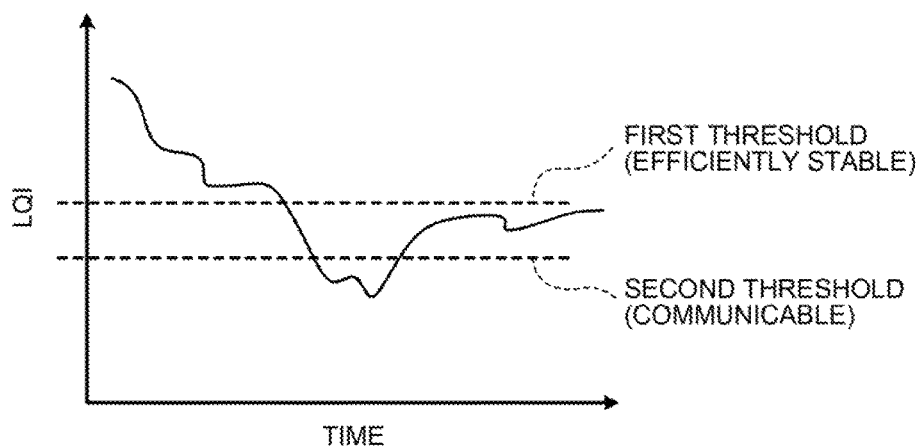
FIG. 5 is a schematic diagram explaining respective examples of first and second thresholds.

FIG. 4 is a schematic diagram explaining an example of the observation apparatus 4. The observation apparatus 4 illustrated in FIG. 4 includes a communication unit 41, a storage 42, and a controller 43. The communication unit 41 is a communication interface communicating with the GW 3. The storage 42 includes an LQI storage 42A and a threshold storage 42B. The LQI storage 42A is a region in which the LQI is stored that is added by the node 2 to the data received by the observation apparatus 4. The threshold storage 42B is a region in which a first threshold and a second threshold are stored. FIG. 5 is a schematic diagram illustrating respective examples of the first and the second thresholds. The first threshold, which is an upper limit value of the LQI in the received data, indicates a state in which the communication state is sufficiently stable. The second threshold, which is a lower limit value of the LQI in the received data, indicates a state in which data can be received while the communication state is not good. The first and the second thresholds are set on the basis of relations among a communication distance, the amount of transmission power, and communication quality, for example.

The controller 43 reads the power control program stored in the storage 42, and configures various processes as functions on the basis of the read power control program. The controller 43 includes an extraction section 43A, an LQI determination section 43B, and an output control section 43C. The extraction section 43A extracts the LQI from the data received from the GW 3 through the communication unit 41.

The LQI determination section 43B determines whether the extracted LQI is smaller than the second threshold stored in the threshold storage 42B. The LQI determination section 43B is an example of the determination unit. When the LQI is smaller than the second threshold, the LQI determination section 43B determines that the communication quality of received data has deteriorated. The LQI determination section 43B determines whether the LQI is equal to or larger than the first threshold. When the LQI is equal to or larger than the first threshold, the LQI determination section 43B determines that the communication quality of received data is good. When the LQI is not smaller than the second threshold and the LQI is not equal to or larger than the first threshold, the LQI determination section 43B determines that the communication quality of received data is normal. When the LQI is equal to or larger than the first threshold, the output control section 43C outputs a delete command serving as an instruction to the node 2 transmitting the data including the LQI. The output control section 43C is an example of the output unit. When the LQI is smaller than the second threshold, the output control section 43C outputs an increase command serving as an instruction to the node 2 transmitting the data including the LQI.

Figure 6A:
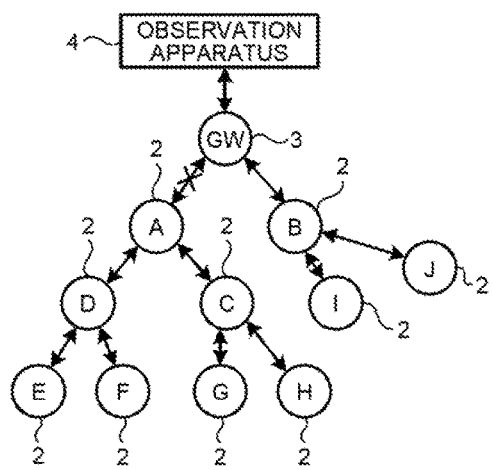
FIGS. 6A to 6C are schematic diagrams explaining an example of operation transition of the observation system according to the embodiment.
Figure 6B:
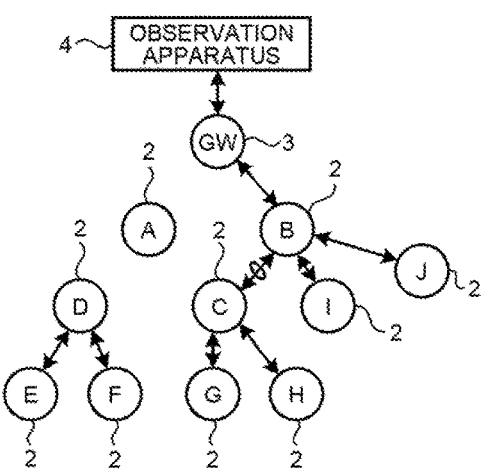
Figure 6C:
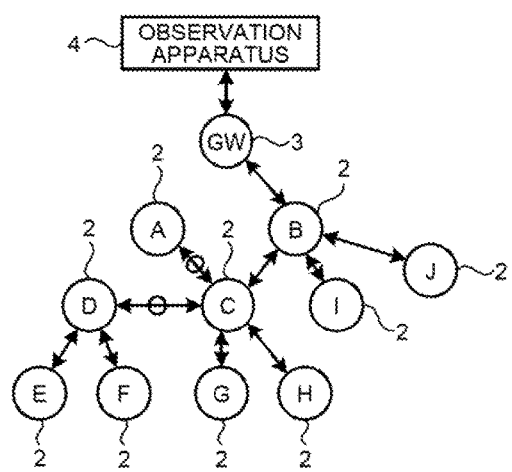

FIGS. 6A to 6C are schematic diagrams explaining an example of operation transition of the observation system 1. The observation system 1 illustrated in FIG. 6A is in a state in which the communication between the node 2 denoted "A", which serves as the parent node, and the GW 3 is disabled. When detecting that the communication between the parent node 2 denoted "A" and the GW 3 is disabled, the parent node 2 denoted "A" transmits the parent node delete command to the node 2 denoted "C" and the node 2 denoted "D", which serve as the child nodes. The parent node 2 denoted "A" transmits the beacon signal for a certain time period. The node 2 denoted "C" and the node 2 denoted "D" also each transmit the beacon signal for a certain time period. The node 2 denoted "B", which serves as the parent node, transmits the beacon response with respect to the beacon signal from the node 2 denoted "C". As a result, the node 2 denoted "C" receives the beacon response from the parent node 2 denoted "B" and registers the node 2 denoted "B" as the parent node of this node 2 denoted "C". The node 2 denoted "C" and the node 2 denoted "B" are in a parent-child relation as illustrated in FIG. 6B.

The node 2 denoted "C" transmits the beacon response with respect to each of the beacon signals from the node 2 denoted "A" and the node 2 denoted "D". As a result, the node 2 denoted "A" and the node 2 denoted "D" each receive the beacon response from the node 2 denoted "C", which serves as the parent node, and each register the node 2 denoted "C" as the parent node thereof. The node 2 denoted "C" and each of the node 2 denoted "A" and the node 2 denoted "D" are in a parent-child relation as illustrated in FIG. 6C.

The following describes the operation of the observation system 1 according to the embodiment. FIG. 7 is a sequence diagram illustrating an example of the processing operation of the whole of the observation system 1 in relation to the power control processing. For expository convenience, the following description is based on a case where the node 2A is the parent node while the nodes 2B are the child nodes of the parent node 2A, and data is transmitted from the parent node 2A to the observation apparatus 4 through the GW 3 (not illustrated). In FIG. 7, one of the child nodes 2B is illustrated. In FIG. 7, the MCU 17 of the child node 2B detects a condition of a sensing target through the sensor element 11 (step S11). The MCU 17 of the child node 2B transmits the data including the detection data to the parent node 2A using the multi-hop communication (step S12).

When the parent node 2A receives the data from the child node 2B (step S13), the calculation section 21 included in the MCU 17 of the parent node 2A calculates the LQI from an electric field intensity at which the data is received from the child node 2B in the multi-hop communication (step S14). The control section 27 included in the MCU 17 of the parent node 2A stores the calculated LQI in the LQI table 15C included in the storage 15 for each ID identifying the child node 2B serving as the communication partner (step S15). The addition section 22 included in the MCU 17 of the parent node 2A adds the calculated LQI to the detection data from the child node 2B after the calculated LQI is stored in the LQI table 15C. Thereafter, the data to which the LQI is added is transmitted to the observation apparatus 4 through the GW 3 (step S16).

When the observation apparatus 4 receives the data from the parent node 2A (step S17), the LQI determination section 43B included in the controller 43 of the observation apparatus 4 extracts the LQI included in the data through the extraction section 43A. The LQI determination section 43B performs determination by comparing the extracted LQI with the first and the second thresholds (step S18). The controller 43 of the observation apparatus 4 determines the change command of the amount of transmission power, the change command being output to the child node 2B associated with the LQI at the later step, on the basis of the determination result on the LQI (step S19). The controller 43 of the observation apparatus 4 transmits the change command to the parent node 2A so as to transmit the determined change command to the child node 2B associated with the LQI (step S20).

The MCU 17 of the parent node 2A receives the change command from the observation apparatus 4, and transmits the change command to the child node 2B (step S21). When the child node 2B receives the change command from the parent node 2A (step S22), the power change unit 16A included in the power source controller 16 of the child node 2B controls the amount of transmission power on the basis of the received change command (step S23). The processing operation illustrated in FIG. 7, thus, ends.

When receiving the data indicating the detection condition from the child node 2B, the parent node 2A illustrated in FIG. 7 calculates the LQI from the electric field intensity at which the data is received, adds the calculated LQI to the received data, and transmits the resulting data to the parent node of this parent node 2A or the observation apparatus 4. The observation apparatus 4 extracts the LQI included in the data from the parent node 2A and performs the determination by comparing the extracted LQI with the first and the second thresholds. The observation apparatus 4 outputs the change command of the amount of transmission power to the child node 2B associated with the LQI included in the received data on the basis of the comparison result of the LQI with the first and the second thresholds. The child node 2B, thus, dynamically changes the amount of transmission power in accordance with the change command from the observation apparatus 4. As a result, wasteful power consumption can be reduced while the multi-hop communication is maintained.

FIG. 8 is a flowchart illustrating an example of the processing operation of the controller 43 included in the observation apparatus 4 in relation to the power control processing. In FIG. 8, the extraction section 43A included in the controller 43 of the observation apparatus 4 determines whether the LQI is extracted from the data received from the node 2 connected to the observation apparatus 4 using the multi-hop communication (step S31). If the LQI is extracted (Yes at step S31), the LQI determination section 43B included in the controller 43 determines whether the extracted LQI is smaller than the second threshold (step S32). If the extracted LQI is smaller than the second threshold (Yes at step S32), the LQI determination section 43B outputs, to the node 2 associated with the LQI, the change command (increase command) to increase the amount of transmission power by a certain amount (step S33). The processing operation illustrated in FIG. 8, thus, ends. When the node 2 receives the increase command, the power change unit 16A included in the power source controller 16 of the node 2 increases the amount of transmission power by the certain amount, resulting in quality in communication with the parent node 2A being improved. As a result, stable data communication can be achieved between the node 2 and the parent node 2A.

If the extracted LQI is not smaller than the second threshold (No at step S32), the LQI determination section 43B determines whether the extracted LQI is larger than the first threshold (step S34). If the extracted LQI is larger than the first threshold (Yes at step S34), the LQI determination section 43B outputs, to the node 2 associated with the LQI, the change command (reduction command) to reduce the amount of transmission power by a certain amount (step S35). The processing operation illustrated in FIG. 8, thus, ends. When the node 2 receives the reduction command, the power change unit 16A included in the power source controller 16 of the node 2 reduces the amount of transmission power by the certain amount. As a result, the power consumption can be reduced while stable data communication is maintained between the node 2 and the parent node 2A.

If no LQI is extracted from the received data (No at step S31), the controller 43 ends the processing operation illustrated in FIG. 8. If the extracted LQI is not larger than the first threshold (No at step S34), the controller 43 determines that the extracted LQI is normal and then ends the processing operation illustrated in FIG. 8.

The controller 43 performing the power source control processing illustrated in FIG. 8 extracts the LQI included in the received data, and outputs the increase command to the child node 2 associated with the received data including the LQI when the extracted LQI is smaller than the second threshold. When receiving the increase command, the child node 2B increases the amount of transmission power, resulting in quality in communication with the parent node 2A being improved. As a result, stable data communication can be achieved between the child node 2B and the parent node 2A.

The controller 43 outputs the reduction command to the child node 2B associated with the received data including the LQI when the extracted LQI is larger than the first threshold. When receiving the reduction command, the child node 2B reduces the amount of transmission power of this node 2. As a result, the power consumption can be reduced while stable data communication is maintained between the child node 2B and the parent node 2A.

FIG. 9 is a sequence diagram illustrating an example of the processing operation of the whole of the observation system 1 in relation to route change processing. In FIG. 9, the MCU 17 of the child node 2B detects a condition of a sensing target through the sensor element 11 (step S41). In FIG. 9, one of the child nodes 2B is illustrated. The MCU 17 of the child node 2B transmits the data including the detection data to the parent node 2A in the multi-hop communication (step S42).

When the parent node 2A receives the data from the child node 2B (step S43), the calculation section 21 included in the MCU 17 of the parent node 2A calculates the LQI from an electric field intensity at which the data is received from the child node 2B in the multi-hop communication (step S44). The MCU 17 of the parent node 2A registers the calculated LQI in the LQI table 15C included in the storage 15 for each ID identifying the child node 2B (step S45). The control section 27 included in the MCU 17 of the parent node 2A adds the LQI to the detection data, and transmits the resulting data to the observation apparatus 4 (step S46). Let the communication determination section 23 included in the MCU 17 determine that no response is received from the observation apparatus 4 in relation to the data receiving and the data transmission has failed the first number of times in a certain time period (step S47). The certain time period is five minutes, for example. The first number of times is five times, for example. When the data transmission has failed the first number of times, the communication determination section 23 determines that the communication environment with the observation apparatus 4 has deteriorated.

The communication determination section 23 included in the MCU 17 of the parent node 2A transmits the data again with a maximum amount of transmission power after the data transmission has failed the first number of times (step S48). Let the communication determination section 23 determine that the data transmission has failed the second number of times in a certain time period (step S49). The second number of times is five times, for example. When the data transmission has failed the second number of times, the communication determination section 23 determines that the communication with the observation apparatus 4 is disabled. When it is determined that the communication with the observation apparatus 4 is disabled, the isolation determination section 24 included in the MCU 17 of the parent node 2A determines that this node 2 is isolated in the observation system 1.

The control section 27 included in the MCU 17 of the parent node 2A deletes the parent node information indicating the parent node of this node 2A (step S50). After the parent node information is deleted, the beacon control section 26 included in the parent node 2A transmits the beacon signal so as to newly search for the node 2 capable of joining the observation system 1 (step S51). When no beacon response with respect to the beacon signal is received, the control section 27 included in the parent node 2A transmits the parent node delete command to the child nodes 2B of this parent node 2A (step S52). The control section 27 deletes the child node information indicating the child nodes 2B of the parent node 2A after transmitting the parent node delete command (step S53).

When the child node 2B receives the parent node delete command from the parent node 2A (step S54), the control section 27 included in the MCU 17 of the child node 2B deletes the already registered ID of the parent node from the parent node table 15A (step S55). The beacon control section 26 included in the MCU 17 of the child node 2B transmits the beacon signal so as to search for other nodes 2 in the observation system 1 (step S56).

When the node 2C adjacent to the child node 2B receives the beacon signal from the child node 2B (step S57), the joining determination section 25 included in the MCU 17 of the node 2C determines whether the child node 2B is allowed to join in the observation system 1. When it is determined that the child node 2B is allowed to join in the observation system 1, the beacon control section 26 included in the MCU 17 of the node 2C transmits the beacon response to the child node 2B, which is the node 2 serving as the transmission origin of the beacon signal (step S58). The control section 27 included in the MCU 17 of the node 2C registers the ID of the node 2 serving as the transmission origin of the beacon signal as the child node 2B in the child node table 15B (step S59).

When the child node 2B receives the beacon response with respect to the beacon signal (step S60), the control section 27 included in the child node 2B registers, in the parent node table 15A as the parent node, the ID of the node 2C, which is the node 2 serving as the response origin of the beacon response (step S62). As a result, the node 2C becomes the new parent node of the child node 2B.

The control section 27 included in the MCU 17 of the child node 2B detects a condition of a sensing target through the sensor element 11 (step S63). The MCU 17 of the child node 2B transmits the data including the detection data to the parent node 2C serving as the parent node in the multi-hop communication (step S64).

When the parent node 2C receives the data from the child node 2B (step S65), the MCU 17 of the parent node 2C calculates the LQI from an electric field intensity at which the data is received (step S66). The parent node 2C stores the calculated LQI in the LQI table 15C for each ID identifying the child node 2B (step S67), and transmits the data to which the LQI is added to the observation apparatus 4 through the GW 3 (step S68). As a result, the observation apparatus 4 receives the data to which the LQI is added through the GW 3 (step S69). The processing operation illustrated in FIG. 9, thus, ends.

The parent node 2A illustrated in FIG. 9 determines that the communication environment has deteriorated when the data communication with the observation apparatus 4 has failed the first number of times in a certain time period, sets the amount of transmission power to a maximum amount, and transmits the data again. The parent node 2A having the amount of transmission power set to the maximum amount, thus, can increase an opportunity to successfully transmit data to the observation apparatus 4.

The parent node 2A determines that the communication with the observation apparatus 4 is disabled when the data transmission to the observation apparatus 4 has failed the second number of times in a certain time period after the amount of transmission power is set to the maximum amount, and transmits the beacon signal. The parent node 2A, thus, can autonomously search for other nodes 2 in the observation system 1 so as to avoid the parent node 2A from being isolated in the observation system 1.

After transmitting the beacon signal, the parent node 2A transmits the parent node delete command to the child nodes 2B of this node 2A. When receiving the parent node delete command, the child node 2B deletes the ID of the parent node in the parent node table 15A, and transmits the beacon signal. The child node 2B, thus, can autonomously search for other nodes 2 in the observation system 1 so as to avoid the child node 2B from being isolated in the observation system 1.

When receiving the beacon signal, the node 2 determines whether the node 2 serving as the transmission origin of the beacon signal is allowed to join in the observation system 1. When the node 2 serving as the transmission origin of the beacon signal is allowed to join in the observation system 1, the node 2 having received the beacon signal transmits the beacon response to the node 2 serving as the transmission origin of the beacon signal. The node 2 having received the beacon signal registers, in the child node table 15B as the child node of this node 2, the ID of the node 2 serving as the transmission origin of the beacon signal. In this way, the node 2 transmitting the beacon response with respect to the beacon signal registers, as the child node of this node 2, the node 2 serving as the transmission origin of the beacon signal. As a result, the node 2 transmitting the beacon signal can be avoided from being isolated in the observation system.

The node 2 having received the beacon response with respect to the beacon signal registers, in the parent node table 15A as the parent node, the ID of the node 2 serving as the transmission origin of the beacon response. As a result, the node 2 having registered the node 2 serving as the transmission origin of the beacon response as the parent node can be avoided from being isolated in the observation system 1.

Figure 10:
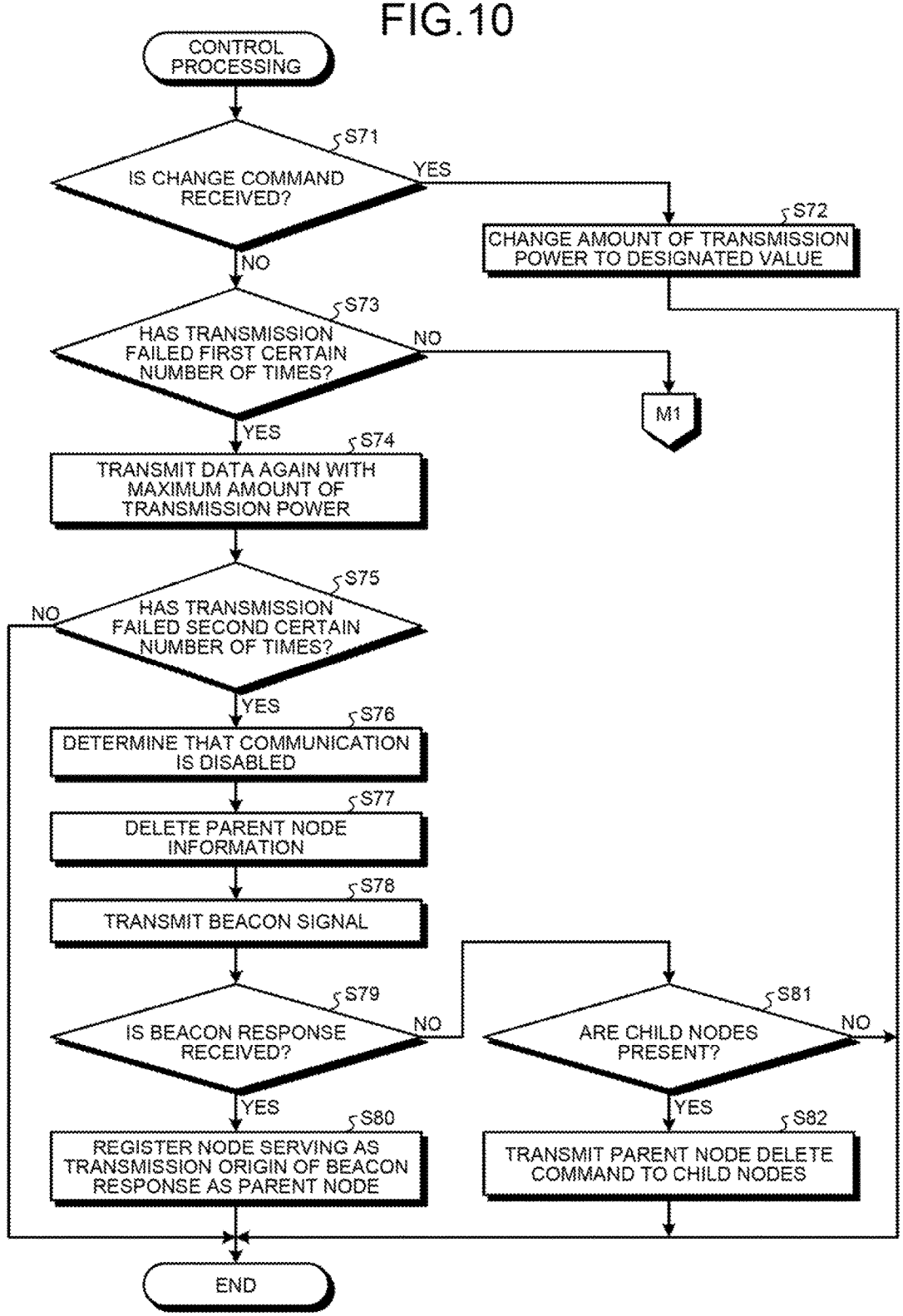
FIG. 10 is a flowchart illustrating an example of processing operation of a micro controller unit (MCU) included in the node in relation to control processing.
Figure 11:
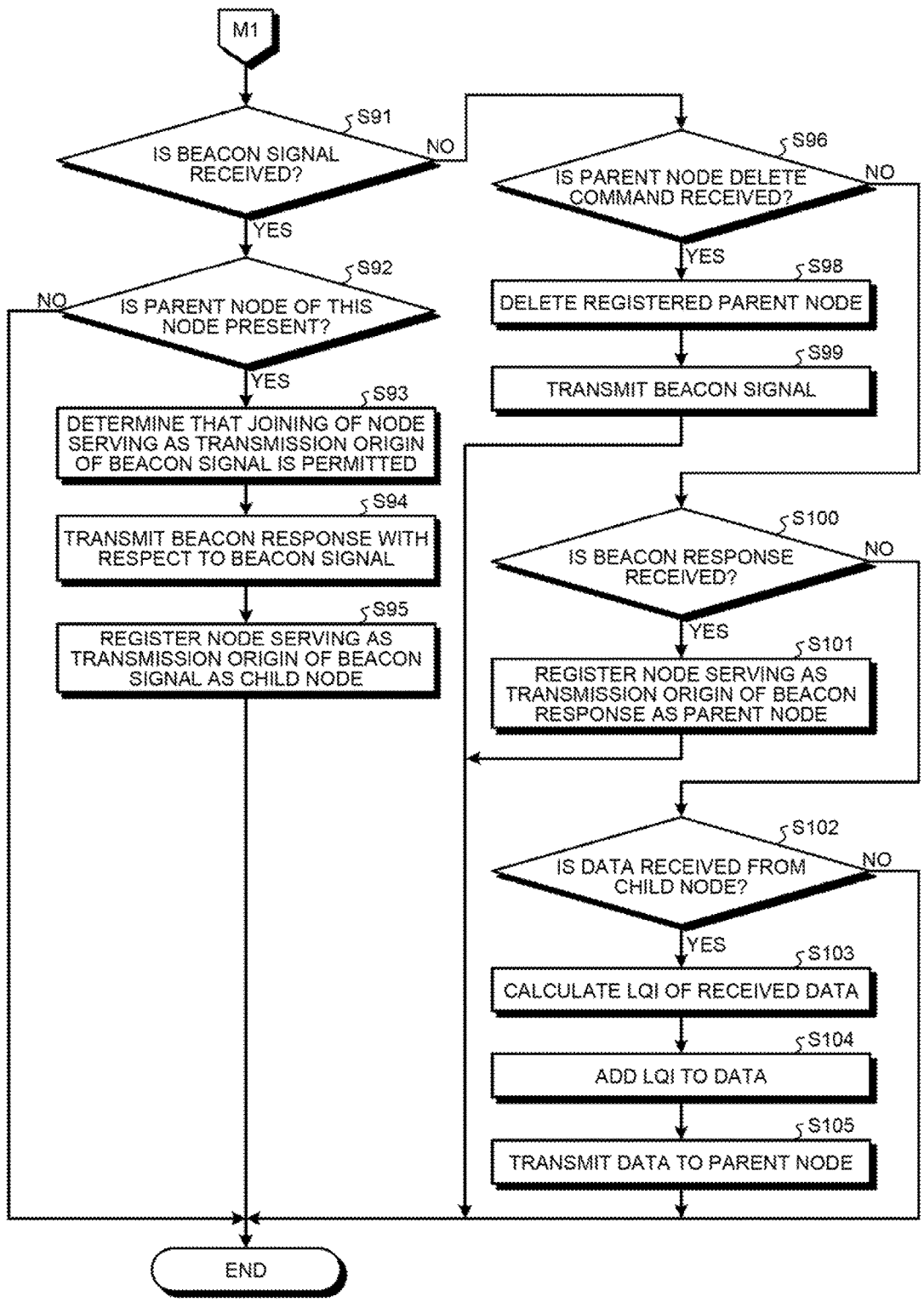
FIG. 11 is a subroutine flowchart illustrating the example of the processing operation of the MCU included in the node in relation to the control processing.

FIGS. 10 and 11 are flowcharts illustrating an example of the processing operation of the node 2 in relation to the control processing. In FIG. 10, the power source controller 16 of the node 2 determines whether the node 2 has received the change command from the observation apparatus 4 (step S71). If the node 2 has received the change command (Yes at step S71), the power change unit 16A included in the power source controller 16 changes the amount of transmission power to the value designated by the change command (step S72). The processing operation illustrated in FIG. 10, thus, ends. Examples of the change command include the increase command and the reduction command. When the change command is the increase command, the value designated by the change command corresponds to the value after a certain amount is increased. When the change command is the reduction command, the value designated by the change command corresponds to the value after a certain amount is reduced.

If the node 2 receives no change command (No at step S71), the communication determination section 23 included in the MCU 17 determines whether the data transmission to the node 2 serving as the transmission destination (or the GW 3) has failed the first number of times in a certain time period (step S73). If the data transmission to the node 2 serving as the transmission destination (or the GW 3) has failed the first number of times (Yes at step S73), the control section 27 determines that the communication environment has deteriorated and transmits the data again to the node 2 serving as the transmission destination (or the GW 3) with a maximum amount of transmission power (step S74).

After transmitting the data again to the node 2 serving as the transmission destination (or the GW 3), the communication determination section 23 included in the MCU 17 determines whether the data transmission to the node 2 serving as the transmission destination (or the GW 3) has failed the second number of times in a certain time period (step S75). If the data transmission to the node 2 serving as the transmission destination (or the GW 3) has failed the second number of times (Yes at step S75), the communication determination section 23 determines that the communication with the node 2 serving as the transmission destination (or the GW 3) is disabled (step S76). If it is determined that the communication is disabled, the control section 27 included in the MCU 17 deletes the parent node information (step S77). The beacon control section 26 included in the MCU 17 transmits the beacon signal (step S78), and determines whether the beacon response with respect to the beacon signal is received (step S79).

If the beacon response is received (Yes at step S79), the beacon control section 26 registers, in the parent node table 15A as the parent node, the ID of the node 2 serving as the transmission origin of the beacon response, i.e., the ID of the node 2 transmitting the beacon response (step S80). The processing operation illustrated in FIG. 10, thus, ends.

If the data transmission to the node 2 serving as the transmission destination (or the GW 3) has not failed the second number of times (No at step S75), the control section 27 ends the processing operation illustrated in FIG. 10. If no beacon response is received (No at step S79), the beacon control section 26 determines whether the child nodes of this node 2 are present (step S81). If the child nodes are present (Yes at step S81) the control section 27 transmits the parent node delete command to the child nodes (step S82), and ends the processing operation illustrated in FIG. 10. If no child nodes are present (No at step S81), the control section 27 ends the processing operation illustrated in FIG. 10.

If the data transmission to the node 2 serving as the transmission destination (or the GW 3) has not failed the first number of times (No at step S73), the control section 27 causes the processing operation to proceed to M1 illustrated in FIG. 11. At M1 illustrated in FIG. 11, the beacon control section 26 included in the MCU 17 determines whether this node 2 received the beacon signal (step S91). If the beacon signal is received (Yes at step S91), the beacon control section 26 determines whether the parent node of this node 2 is present (step S92). If the parent node of this node 2 is present (Yes at step S92), the joining determination section 25 included in the MCU 17 determines that the joining of the node 2 serving as the transmission origin of the beacon signal is permitted (step S93). When it is determined that joining of the node 2 serving as the transmission origin of the beacon signal is permitted, the beacon control section 26 transmits the beacon response with respect to the beacon signal to the node 2 serving as the transmission origin of the beacon signal (step S94). After the beacon response is transmitted, the control section 27 registers, in the child node table 15B as the child node, the ID of the node 2 serving as the transmission origin of the beacon signal (step S95), and ends the processing operation illustrated in FIG. 11.

If no beacon signal is received (No at step S91), the control section 27 determines whether the parent node delete command is received (step S96). If the parent node delete command is received (Yes step S96), the control section 27 deletes the registered parent node information (step S98). The beacon control section 26 transmits the beacon signal (step S99). The processing operation illustrated in FIG. 11, thus, ends.

If no parent node delete command is received (No at step S96), the beacon control section 26 determines whether the beacon response is received (step S100). If the beacon response is received (Yes at step S100), the beacon control section 26 registers, in the parent node table 15A as the parent node, the ID of the node 2 serving as the transmission origin of the beacon response (step S101). The processing operation illustrated in FIG. 11, thus, ends. If the parent node of this node 2 is absent (No at step S92), the joining determination section 25 ends the processing operation illustrated in FIG. 11.

If no beacon response is received (No at step S100), the control section 27 determines whether the data is received from the child node (step S102). If the data from the child node is received (Yes at step S102), the calculation section 21 calculates the LQI from an electric field intensity at which the data is received (step S103). The addition section 22 adds the calculated LQI to the data (step S104), transmits the data to which the LQI is added to the parent node 2A (step S105). The processing operation illustrated in FIG. 11, thus, ends. If no data is received from the child node (No at step S102), the controller 27 ends the processing operation illustrated in FIG. 11.

When receiving the change command from the observation apparatus 4, the node 2 changes the amount of transmission power in accordance with the change command. Each node 2, thus, can dynamically change the amount of transmission power in accordance with the instruction from the observation apparatus 4.

When the data transmission to the observation apparatus 4 (or the GW 3) or the parent node 2A has failed the first number of times in a certain time period, the node 2 transmits the data again with a maximum amount of transmission power. The node 2 having started the data transmission again with the maximum amount of transmission power increases an opportunity to successfully transmit the data.

When the data transmission to the observation apparatus 4 (or the GW 3) or the parent node 2A has failed the second number of times in a certain time period after data transmission started again with the maximum amount of transmission power, the node 2 determines that the communication with the observation apparatus 4 (or the GW 3) or the parent node 2A is disabled, and transmits the beacon signal. As a result, the node 2 can autonomously search for the node 2 capable of communicating with this node 2 in the observation system 1. The node 2 transmitting the beacon signal, thus, can be avoided from being isolated in the observation system 1.

When receiving the beacon response with respect to the beacon signal, the node 2 registers, in the parent node table 15A as the parent node, the ID of the node 2 serving as the transmission origin of the beacon response. The node 2 having registered the node 2 serving as the transmission origin of the beacon response as the parent node, thus, can be avoided from being isolated in the observation system 1.

When the node 2 receives no beacon response signal after transmitting the beacon signal, and the child nodes of this node 2 are present, the node 2 transmits the parent node delete command to the child nodes. When receiving the parent node delete command, the child node 2 can delete the ID of the parent node 2A from the parent node table 15A.

The node 2 transmits the beacon signal after deleting the parent node. The node 2 transmitting the beacon signal after deleting the parent node can autonomously search for other nodes 2 in the observation system 1. As a result, the node 2 transmitting the beacon signal can be avoided from being isolated in the observation system 1.

When transmitting the beacon response with respect to the beacon signal, the node 2 registers, in the child node table 15B as the child node, the ID of the node 2 serving as the transmission origin of the beacon signal. As a result, the node 2 transmitting the beacon signal can be avoided from being isolated in the observation system 1.

When receiving the beacon response, the node 2 registers, in the parent node table 15A as the parent node, the ID of the node 2 serving as the transmission origin of the beacon response. As a result, the node 2 having received the beacon response can be avoided from being isolated in the observation system 1.

When receiving the data from the child node, the node 2 calculates the LQI from the electric field intensity at which the data is received, adds the calculated LQI to the received data, and transmits the resulting data to the observation apparatus 4 (or the GW 3) or the parent node 2.

In the observation system 1 according to the embodiment, the observation apparatus 4 outputs the change command of the amount of transmission power to the node 2 associated with the LQI of the data received by the observation apparatus 4 from the node 2 using the multi-hop communication on the basis of the comparison result of the LQI with the first and the second thresholds. Each node 2, thus, can dynamically change the amount of transmission power in accordance with the instruction from the observation apparatus 4. Each node 2 can reduce the power consumption while maintaining stable communication.

When the data transmission to the GW 3 or the parent node 2A has failed the first number of times in a certain time period, the node 2 transmits the data again with a maximum amount of transmission power. The node 2 having started the data transmission again with the maximum amount of transmission power, thus, increases an opportunity to successfully transmit the data.

When determining that the communication with the GW 3 or the parent node 2A is disabled, the node 2 transmits the beacon signal, thereby making it possible to autonomously search for the node 2 capable of communicating with this node 2 in the observation system 1. As a result, the node 2 transmitting the beacon signal can be avoided from being isolated in the observation system 1.

When the child nodes of the node 2 are present after the node 2 transmits the beacon signal, the node 2 transmits the parent node delete command to the child nodes. When receiving the parent node delete command, the node 2 can delete the ID of the parent node 2A from the parent node table 15A.

When transmitting the beacon response with respect to the beacon signal, the node 2 registers, in the child node table 15B as the child node, the ID of the node 2 serving as the transmission origin of the beacon signal. As a result, the node 2 transmitting the beacon signal can be avoided from being isolated in the observation system 1.

In the embodiment, the GW 3 is disposed between the observation apparatus 4 and the parent nodes 2, and the observation apparatus 4 collects information from each node 2 through the GW 3. The GW 3 may, however, function as the observation apparatus 4. In this case, the observation apparatus 4 can be eliminated from the observation system 1. Alternately, the observation apparatus 4 may function as the GW 3. In this case, the GW 3 can be eliminated from the observation system 1.

When the data transmission has failed the first number of times in a certain time period, the amount of transmission power of the node 2 is set to a maximum amount of transmission power. The amount of transmission power of the node 2 is not necessarily set to the maximum amount of transmission power. The amount of transmission power of the node 2 may be set to be increased.

The communication quality is not limited to be represented by the LQI. Any indicator may be employed for representing the communication quality.

The components of the units and sections illustrated in the drawings are functionally conceptual, and are not always physically configured as illustrated in the drawings. Specific forms of distributions and integrations of the units and sections are not limited to those illustrated in the drawings. All or part of the units and sections can be configured to be functionally or physically distributed or integrated in arbitrary units in accordance with various loads, the usage conditions, and the like.

All or any part of the various processing functions performed by the apparatuses may be executed by a micro computer such as a central processing unit (CPU), a micro processing unit (MPU), and a micro controller unit (MCU). Obviously, all or any part of the various processing functions may be achieved by a program analyzed and executed by the CPU (or the micro computer such as an MPU or an MCU), or achieved by hardware based on wired logic.

Figure 12:
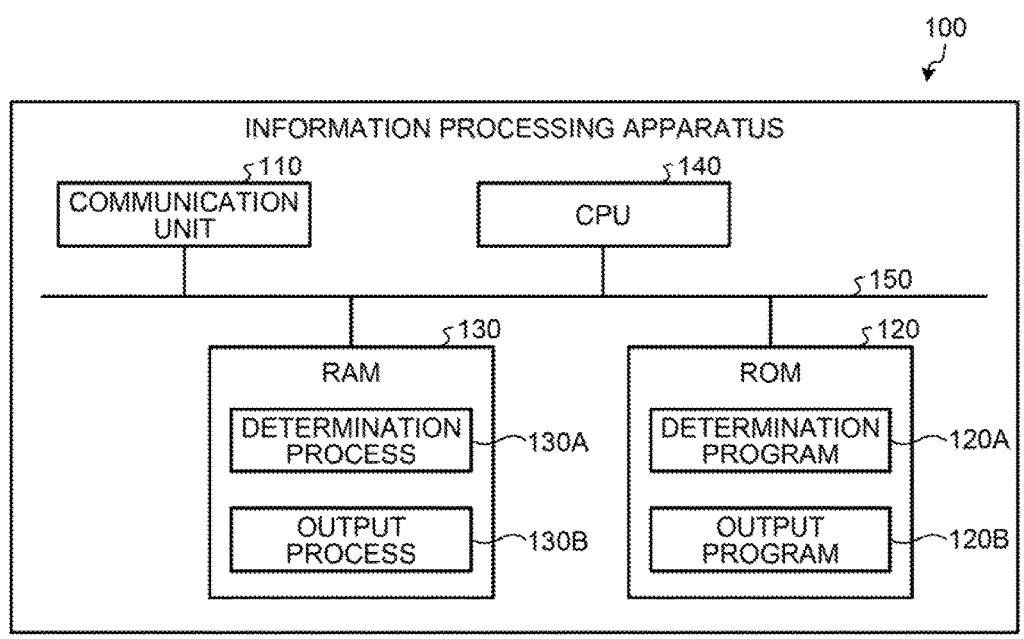
FIG. 12 is a schematic diagram illustrating an example of an information processing apparatus that executes a power control program.

The various processing described in the embodiment can be achieved with a CPU in the information processing apparatus by executing a preliminarily prepared program. The following describes an example of the information processing apparatus executing a program having the same functions as the embodiment described above. FIG. 12 is a schematic diagram illustrating an example of the information processing apparatus that executes the power control program.

As illustrated in FIG. 12, an information processing apparatus 100, which executes the power control program, includes a communication unit 110, a read only memory (ROM) 120, a random access memory (RAM) 130, and a CPU 140. The communication unit 110, the ROM 120, the RAM 130, and the CPU 140 are coupled with one another through a bus 150. The communication unit 110 is a communication interface that collects information from the nodes using the multi-hop communication between the multiple nodes.

The ROM 120 preliminarily stores therein the power control program that achieves the same functions as described in the embodiment. The ROM 120 stores therein a determination program 120A and an output program 120B as the power control program. The power control program may be recorded in a recording medium readable by a computer using a drive (not illustrated), instead of being recorded in the ROM 120. Examples of the recording medium include a portable recording medium such as a compact disc (CD)-ROM, a digital versatile disc (DVD), or a universal serial bus (USB) memory, and a semiconductor memory such as a flash memory.

The CPU 140 reads the determination program 120A from the ROM 120 and causes the program to function as a determination process 130A in the RAM 130. The CPU 140 reads the output program 120B from the ROM 120 and causes the program to function as an output process 130B in the RAM 130.

The CPU 140 included in the information processing apparatus 100 determines whether the communication quality received from the node using the multi-hop communication is higher than a certain threshold. When the communication quality is higher than the certain threshold, the CPU 140 outputs the change command to change the amount of transmission power in the multi-hop communication to the node associated with the communication quality. This allows the amount of transmission power of respective nodes in the collecting system to be dynamically changed.

An aspect of the invention allows the amounts of transmission power of respective nodes in the collecting system to be dynamically changed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A collecting system comprising:
a plurality of nodes including a first processor; and
a collecting apparatus that collects information from the nodes using multi-hop communication for communicating with the nodes,
the collecting apparatus including a second processor configured to:
determine whether communication quality received from the node using the multi-hop communication is higher than a certain threshold; and
output a change command to the node associated with the communication quality when determining that the communication quality is higher than the certain threshold, the change command being a command to change an amount of transmission power in the multi-hop communication, wherein
the first processor is configured to:
determine whether deterioration is detected in communication with the collecting apparatus or a parent node of the node, the collecting apparatus and the parent node communicating with the node using the multi-hop communication;
increase the amount of transmission power in the multi-hop communication when determining that the deterioration is detected in the communication; and
start again the communication with the collecting apparatus or the parent node.

2. The collecting system according to claim 1, wherein the first processor is configured to:
determine whether it is detected that the communication with the collecting apparatus or the parent node is disabled after the amount of transmission power in the multi-hop communication is increased and the communication with the collecting apparatus or the parent node starts again; and
output a beacon signal for searching for other nodes capable of communicating with the node in the collecting system when detecting that the communication is disabled.

3. The collecting system according to claim 2, wherein the first processor is configured to:
determine that the node of the first processor is isolated in the collecting system when having failed to detect a response with respect to the beacon signal in a certain time period from the start timing of transmitting the beacon signal; and
determine whether a child node of the node is present when determining that the node is isolated; and
output a delete command to the child node when determining that the child node of the node is present, the delete command being a command to delete identification information identifying the parent node of the node.

4. The collecting system according to claim 3, wherein the first processor is configured to:
delete the identification information identifying the parent node of the node when receiving the delete command; and
output the beacon signal for searching for other nodes capable of communicating with the node in the collecting system.

5. A collecting apparatus comprising a processor configured to:
determine whether communication quality received from a node using multi-hop communication for communicating with a plurality of nodes is higher than a certain threshold; and
output a change command to the node associated with the communication quality when determining that the communication quality is higher than the certain threshold, the change command being a command to change an amount of transmission power in the multi-hop communication, wherein
the plurality of nodes include a processor configured to:
determine whether deterioration is detected in communication with the collecting apparatus or a parent node of the node, the collecting apparatus and the parent node communicating with the node using the multi-hop communication;

increase the amount of transmission power in the multi-hop communication when determining that the deterioration is detected in the communication; and start again the communication with the collecting apparatus or the parent node.

6. A power control method that is implemented by an information processing apparatus, the power control method comprising:

determining, by a processor of the information processing apparatus, whether communication quality received from a node using multi-hop communication for communicating with a plurality of nodes is higher than a certain threshold; and outputting, by the processor, a change command to the node associated with the communication quality when determining that the communication quality is higher than the certain threshold, the change command being a command to change an amount of transmission power in the multi-hop communication, wherein the plurality of nodes include a processor configured to:

determine whether deterioration is detected in communication with the collecting apparatus or a parent node of the node, the collecting apparatus and the parent node communicating with the node using the multi-hop communication;

increase the amount of transmission power in the multi-hop communication when determining that the deterioration is detected in the communication; and start again the communication with the collecting apparatus or the parent node.

* * * * *